United States Patent
Dalin

(10) Patent No.: US 12,402,574 B2
(45) Date of Patent: Sep. 2, 2025

(54) METHOD FOR OPTIMIZATION OF DRIVING PARAMETERS OF CULTIVATION PLANT, AND CULTIVATION PLANT COMPRISING A CULTIVATION ROOM AND AN ADJACENT FACILITY EXCHANGING RESOURCES

(71) Applicant: SWEGREEN AB, Stockholm (SE)

(72) Inventor: Linus Dalin, Båstad (SE)

(73) Assignee: SWEGREEN AB, Stockholm (SE)

( * ) Notice: Subject to any disclaimer, the term of this patent is extended or adjusted under 35 U.S.C. 154(b) by 64 days.

(21) Appl. No.: 18/268,003

(22) PCT Filed: Jan. 29, 2021

(86) PCT No.: PCT/SE2021/050062
§ 371 (c)(1),
(2) Date: Jun. 16, 2023

(87) PCT Pub. No.: WO2022/131985
PCT Pub. Date: Jun. 23, 2022

(65) Prior Publication Data
US 2024/0049655 A1    Feb. 15, 2024

(30) Foreign Application Priority Data
Dec. 18, 2020  (WO) ............... PCT/SE2020/051240

(51) Int. Cl.
*A01G 9/18*   (2006.01)
*A01G 9/24*   (2006.01)
(Continued)

(52) U.S. Cl.
CPC ............ *A01G 9/18* (2013.01); *A01G 9/246* (2013.01); *A01G 9/247* (2013.01); *A01G 9/249* (2019.05);
(Continued)

(58) Field of Classification Search
CPC ............ A01G 9/18; A01G 9/24; A01G 9/246
See application file for complete search history.

(56) References Cited

U.S. PATENT DOCUMENTS

| 4,163,342 | A | 8/1979 | Fogg et al. |
| 4,166,341 | A | 9/1979 | Vestergaard |

(Continued)

FOREIGN PATENT DOCUMENTS

| WO | 2019162192 A1 | 8/2019 |
| WO | 2019191048 A1 | 10/2019 |
| WO | 2019222860 A1 | 11/2019 |

OTHER PUBLICATIONS

Swedish Intellectual Property Office ; International Search Report & Written Opinion dated Jun. 23, 2022; PCT/SE2021/050062 filed Jan. 29, 2021; pp. 1-24.

(Continued)

*Primary Examiner* — Kristen C Hayes
(74) *Attorney, Agent, or Firm* — FisherBroyles, LLP

(57) ABSTRACT

An optimization method for a cultivation plant comprises a cultivation room comprising an air circuit, a water circuit, a heat circuit, a light circuit, a nutrition circuit and a spacing circuit, and a control unit configured to control the circuits. The cultivation room includes a plant bed and a plant yield control unit configured to give input on growth and/or quality of the plants to the control unit. The control unit being configured to store driving parameters for the circuits and correlated input from the yield control unit. The cultivation plant comprises an adjacent facility frequented by carbon dioxide generating entities. The adjacent facility being arranged adjacent the cultivation room. The air circuit comprises an intake conduit configured to lead air from the adjacent facility to the air circuit.

11 Claims, 6 Drawing Sheets

(51) Int. Cl.
    *A01G 9/26*         (2006.01)
    *G05B 13/02*       (2006.01)
    *G05B 13/04*       (2006.01)

(52) U.S. Cl.
    CPC ........... *A01G 9/26* (2013.01); *G05B 13/0265* (2013.01); *G05B 13/042* (2013.01)

(56) References Cited

U.S. PATENT DOCUMENTS

| | | | |
|---|---|---|---|
| 4,216,618 | A | 8/1980 | Haub et al. |
| 10,421,618 | B2* | 9/2019 | Millar ..................... B08B 13/00 |
| 10,624,275 | B1 | 4/2020 | Lewis |
| 10,709,073 | B2* | 7/2020 | Millar ..................... A01G 9/24 |
| 12,089,544 | B2* | 9/2024 | Deane ..................... A01G 31/02 |
| 2004/0163308 | A1 | 8/2004 | Uchiyama |
| 2011/0247265 | A1* | 10/2011 | Tsai ........................ A01G 9/18 165/45 |
| 2012/0311926 | A1 | 12/2012 | Mittelmark |
| 2017/0354100 | A1 | 12/2017 | Snyder |
| 2018/0359955 | A1 | 12/2018 | Millar |
| 2018/0359956 | A1* | 12/2018 | Millar ................... A01G 31/042 |
| 2018/0359970 | A1* | 12/2018 | Millar ................... A01G 9/0293 |
| 2018/0362265 | A1* | 12/2018 | Millar ................... B08B 9/0826 |
| 2019/0174684 | A1 | 6/2019 | Spence |
| 2020/0184153 | A1 | 6/2020 | Bongartz et al. |
| 2020/0196535 | A1 | 6/2020 | Dagondon et al. |

OTHER PUBLICATIONS

Swedish Intellectual Property Office ; International Search Report & Written Opinion dated Jun. 23, 2022; PCT/SE2021/051240 filed Dec. 18, 2020; pp. 1-12.

EP Search Report from corresponding EP application No. 21907230, mailed Oct. 22, 2024, 11 pages.

* cited by examiner

METHOD FOR OPTIMIZATION OF DRIVING PARAMETERS OF CULTIVATION PLANT, AND CULTIVATION PLANT COMPRISING A CULTIVATION ROOM AND AN ADJACENT FACILITY EXCHANGING RESOURCES

CROSS-REFERENCE TO RELATED APPLICATIONS

This application is a National Phase application, and it claims priority to PCT/SE2021/050062 which has a filing date of Jan. 29, 2021, which is based on and claims priority to PCT/SE2020/051240 which has a filing date of Dec. 18, 2020, each of which is hereby incorporate by reference in their entirety.

TECHNICAL FIELD

The invention relates to an optimization method for a cultivation plant comprising an air circuit, a water circuit, a heat circuit, a light circuit, a nutrition circuit and a spacing circuit, the cultivation plant comprising a control unit configured to control the circuits. The cultivation plant also comprises a plant bed for plants fed by the circuits.

BACKGROUND ART

It is well-known to cultivate vegetables and plants in a greenhouse using artificial lighting and adding of nutrition and carbon dioxide. Greenhouses have the advantage of a controlled environment but they are also energy consuming.

Hence, there is a need for an optimized process utilizing energy in the most efficient manner.

SUMMARY OF INVENTION

The invention optimizes utilization of natural recourses as well as minimizes energy consumption. The invention uses several circuits that feed nutrition, water, light, heat and carbon dioxide rich air to plants in a plant bed and controls the same for optimum conditions. The invention dynamically controls the circuits for optimum growth of the plants and optimum efficiency of water, nutrition, air, heat and light. The different circuits are controlled based on yield and quality and based on optimum efficiency of each of the circuits and the result of changes in the various circuits are reflected in the yield and quality and minimum use of water, nutrition, air, heat and light and used in a control loop arrangement to further enhance yield and quality and/or efficiency of water, nutrition, air, heat and light by changing parameters in the circuits. Since there are numerous factors, i.e. variable parameters, related to the circuits that is important to the yield and quality of the plants, the control loop is an intricate optimization routine that has to take into account how the changes of the parameters have or have not a synergistic effect. This requires a control unit that not only stores the value of each parameter at a given point in time but also has the ability to receive, store and compare yield and quality with the stored parameters as will be explained further below.

The invention is described as gathering and utilizing information for optimizing parameters. Here it should be noted that "parameters" and "information" refer to data that can be transmitted, received, stored and used in computer calculations.

The invention relates to a method for optimizing a plant and driving parameters in a cultivation plant comprising a cultivation room comprising an air circuit, a water circuit, a heat circuit, a light circuit, a nutrition circuit and a spacing circuit, wherein the air circuit comprises a dehumidification unit configured to dehumidify air in the air circuit and feed excess water to the water circuit, the cultivation plant comprising a control unit configured to control the circuits, the cultivation room comprising a plant bed for plants and a plant yield control unit analyzing growth and/or quality of the plants, wherein the method comprises the steps of training the control unit in a training cultivation plant comprising a training control unit, corresponding circuits and plant yield control unit by a)—the training control unit sending start driving parameters to the circuits, the training control unit storing the driving parameters, the plant yield control unit sending growth and/or quality information to the training control unit, b)—the training control unit receiving growth and/or quality information, the training control unit storing growth and/or quality information, the training control unit comparing stored driving parameters with growth and/or quality information, the training control unit analyzing which parameter or parameters contribute towards a positive growth and/or quality by comparing stored driving parameters, and the training control unit analyzing which parameters contribute towards a negative growth and/or quality by comparing stored driving parameters.

and the training control unit overlaying the analysis on previous analysis in order to over time build a model of how the growth and quality is affected by the driving parameters by weighing the contributions to the decision with positive reinforcement for successful contribution and negative reinforcement for less successful contribution the training control unit (8) changing one or more driving parameters by either randomly changing one or more parameters or combining parameters from multiple sets of stored driving parameters to create a new set of driving parameters not tested before, the training control unit sending changed driving parameters to the circuits, the training control unit storing the driving parameters, the plant yield control unit sending growth and/or quality information to the training control unit, c)—the training control unit performing steps b) until a predetermined minimum level of positive change of growth and/or quality is reached, d)—the training control unit (8) sending stored driving parameters to the control unit for driving the cultivation plant (1) after finalization of step c) according to a chosen parameter strategy.

Here, it should be noted that the ideal time of growth is set by the parameter strategy and the predetermined quality is set by the quality measure chosen for the specific plant. The plant yield control unit comprises means for checking growth and quality. Growth is a separate parameter and quality is a separate parameter. A high yield, i.e. growth per time unit, of the plant does not necessarily mean that the quality is good why this is checked as a separate parameter. Here, quality refers to a design parameter set up by the operator of the cultivation plant. It can be color and/or taste and/or texture and/or any other suitable parameter. Furthermore, the plant yield control unit is not limited to measure both growth and quality, but any one of growth or quality can be measured and further yield parameters can be added. The plant yield control unit comprises means for measuring the selected parameters at specific points in time. The chosen points in time are selected such that they correlate with measurements made in one or more of the other circuits, i.e. the stored driving parameters in the control unit. The correlation is necessary in order to be able to couple the yield parameters to the stored driving parameters and thus get feedback on changes of the driving parameters in one or more circuits. Growth can be measured by any suitable sensor arrangement that can identify growth of a plant. Quality can be measured by any suitable sensor arrangement that can identify one or many of the design parameters. However, the growth and/or quality can be judged manually by one or more persons that check and evaluate the plant growth and/or quality. The evaluation of growth can be made by simply measuring the plant at different points in time and where the end of the growth cycle is determined by e.g. a declining growth rate and/or when the plant size has reached a set value. The plant size can be height and/or width of the entire plant or one or more parts of the plant, e.g. leafs, buds or plant stems. The quality can be judged dependent on plant and targeted end user, and for some plants color is more important than taste, but it can also be the opposite. Quality can further relate to one or more selected nutrition. Quality can also be texture and feel of the plant. The invention is not limited to these examples, but combinations of the examples are possible as well as additional aspects on quality.

The method comprises a software-based optimization routine that uses collected data on growth and/or quality that is dependent on driving parameters in each circuit. The driving parameters are parameters that influence growth and/or quality in different ways. The complexity here lies in that a change of one parameter may give one beneficial result that can be identified, but changing another parameter may inhibit the beneficial result or may enhance the beneficial result. The different circuits driving the cultivation room comprises a large number of driving parameters, for example carbon dioxide, air speed, air mass flow and direction of air relative the plants in the air circuit; amount of water in the water circuit, temperature in the heat circuit, radiant flux in the light circuit, nutrition in the nutrition circuit; and spacing between plants in the spacing circuit. Here, the nutrition circuit itself comprises many different nutrition that can be optimized themselves. Hence, the large number of parameters and their possible combinatory effect, i.e. the synergistic effects, on the growth and/or quality puts high demand on the possibility to correlate the parameters in the best way over time. Here, the optimization routine gathers data over time and correlates changes in the parameters with the effect on growth and/or quality.

Here, it is important that the correlation relates to when in time the changes are made and what the correlated effect was on the growth and/or quality.

One possibility is to change one parameter at the time over a range of changes and wait to see what the effect on growth and/or quality was for the variations of the parameter and then store the effect from each change of the parameter. The changes of all parameters are stored together with the correlated effect on growth and/or quality. This possibility gives a matrix of driving parameters and correlated effect that can be used in the optimization method, but the difficulty here lies in finding the synergistic effect of changes of the parameters. One way to solve this could be to change a first parameter and lock the other parameters at predetermined values and then change and lock a second parameter, lock all other parameters except the first parameter which is changed all over again, and perform the same routine for all parameters. However, this is a time-consuming task since it takes days or weeks to see the effect of the changes in the plants. For example, 10 parameters with 10 different values typically gives 10 to the power of 10 combinations which together with e.g. 10 days growth gives a test cycle in the order of 274 000 000 years. Even though the test cycle would comprise millions of plants tested simultaneously, the test cycle would still take in the order of 274 years to complete. Here, one should take into consideration that each parameter could be changed more than ten times which further add to the complexity.

In view of the above, the method comprises in step a) starting values for the parameters based on empiric data that gives a good growth and/or quality. In steps b) and c) the method preferably comprises the steps of changing numerous parameters at the same time. The control unit stores the changed parameters and the growth and/or quality data into a table of data used by the control unit when evolving the parameters such that changes converge towards a better growth and or/quality over time. The control unit may comprise calculating means that can interpolate and extrapolate between successful parameter values in one or all dimensions, i.e. for one or more of the parameters. The control unit can also, or as an alternative, comprise a number generator that gives changes to one or more of the parameters either by randomly changing one or more parameters or combining parameters from multiple sets of stored driving parameters to create a new set of driving parameters not tested before.

The control unit evolves the method by overlaying the analysis on previous analysis in order to over time build a model of how the growth and quality is affected by the driving parameters by weighing the contributions to the decision with positive reinforcement for successful contribution and negative reinforcement for less successful contribution. The method steps b) and c) can be performed by a number of known techniques referred to within the realm of artificial intelligence using artificial neural networks and e.g. machine learning and/or deep learning. The control unit has further the ability to combine stored recipes of parameters using generic algorithms, which algorithms are known in the art per se. Here, "stored recipes" refers to stored parameters from a number of training loops according to step b).

The control unit can be set to operate such that each parameter is given a range of values between which the parameters can be changed. The control unit can also be set to operate one or more parameters under fixed values not to be part of the optimization method.

According to one example, a number of test cultivation plants are established, each connected to the above-mentioned circuits. Each training cultivation plant comprises one or a few plants subject to the changes of the parameters according to the optimization method. The training cultivation plants are driven simultaneously with same or different parameters and the control unit collects data to be used driving a full-scale cultivation plant.

According to one example, the method comprises in step b) the step of the plant yield control unit sending growth and/or quality information when a predetermined level of growth and/or quality has been reached and/or when the rate of growth has reached a predetermined minimum level, i.e. when the growth rate declines towards the minimum value such that further growth is considered to be too time consuming.

According to one example, the method comprises the step of:
  storing driving parameters and correlated progressive information on growth and/or quality during a growth cycle of the plant.

According to one example, the method comprises the step of
  changing driving parameters dependent on progressive information.

According to one example, the plant yield control unit is configured to send the progressive growth and/or quality information during the growth cycle at a predetermined frequency, i.e. the plant yield control unit sends progressive growth and/or quality information from the start of the growth and at predetermined time intervals until the predetermined level of growth and/or quality has been reached and/or when the rate of growth has reached the predetermined minimum level. The training control unit stores the progressive information correlated to the driving parameters sent at the start. One advantage here is that the method allows for learning of an early detection on growth and/or quality dependent on changed parameters such that the training control unit can abort further driving of plants with less favorable effect on growth and/or quality, i.e. the control unit can identify if the plants(s) reacts in a positive way with changed parameters before the plant is fully grown. Here, it should be noted that the step of aborting early is only possibility after the training control unit has enough data stored regarding growth and/or quality of fully grown plant(s) and correlated progressive information. Furthermore, the progressive information can be used to check growth rate dependent on chosen parameter strategy.

According to one example, the method, after completing step c), further comprises step
  c1—the training control unit performing steps b) minimizing one or more of the driving parameters until the growth and/or quality deviates negatively from the predetermined level of growth and/or quality. This step is intended to find a minimum use of resources in the circuits, e.g. water, nutrition, energy, air, carbon dioxide etc., without compromising the time of growth and/or quality. Here, it should be noted that the ideal time of growth is set by the parameter strategy and the predetermined quality is set by the quality measure chosen for the specific plant.

According to one example step c) relates to finding a parameter strategy for optimum growth and quality. One advantage here is that the method finds driving parameters for an optimum balance of growth in view of quality.

According to one example step c) relates to finding a parameter strategy for minimum level of growth with respect to time and with a predetermined quality. One advantage here is that the method finds driving parameters that slows down the growth rate of the plant but with maintained quality of the final product/plant. For example, this parameter strategy can be used in the event that the demand for the plant has gone down or that a trend shows a lesser demand in the near future, and a slower growth rate gives a delay in reaching the final product/plant that allows for meeting a delayed and increased demand.

According to one example step c) relates to finding a parameter strategy for maximum level of growth with a predetermined quality. One advantage here is that the method finds driving parameters that speeds up the growth rate of the plant but with maintained quality of the final product/plant. For example, this parameter strategy can be used in the event that the demand for the plant has increased or that a trend shows a higher demand in the near future, and a higher growth rate gives a more early final product/plant that allows for meeting the increased demand.

According to one example, the method step a) comprises the step of:
  the training control unit receiving start driving parameters from an external source. Here, the start driving parameters may be collected or derived from an external source of information, for example published research data and/or an external AI solution and/or information from the full-scale production plant, etc.

The invention further relates to a method for optimizing a plant and driving parameters in a cultivation plant comprising a cultivation room comprising an air circuit, a water circuit, a heat circuit, a light circuit, a nutrition circuit and a spacing circuit, wherein the air circuit comprises a dehumidification unit configured to dehumidify air in the air circuit and feed excess water to the water circuit,
  the cultivation plant comprising a control unit configured to control the circuits,
  the cultivation room comprising a plant bed for plants and a plant yield control unit analyzing growth and/or quality of the plants and driving parameters for the circuits,
  wherein the method comprises the steps of
  a)—the control unit receiving driving parameters to the circuits from the training control unit dependent on parameter strategy,
  the control unit storing the driving parameters,
  the control unit sending driving parameters to the circuits Here, the full-scale production plant benefits from the trained data/information regarding suitable driving parameters dependent on chosen parameter strategy. The control unit can collect driving parameters from the training control unit upon change of chosen parameter strategy, but as an alternative the control unit has stored all or selected data from the training control unit such that the control unit can send suitable driving parameters to the circuits upon change of chosen parameter strategy without further communication with the training control unit.

According to one example, the method further comprises steps b):
  the plant yield control unit sending growth and/or quality information to the control unit.
  the control unit receiving growth and/or quality information,
  the control unit storing growth and/or quality information.

Here, the full-scale production plant further stores information that can be used for optimization in the training control environment.

According to one example, the method further comprises the following steps:
  Step b) further comprising the steps of:
    the control unit comparing stored driving parameters with growth and/or quality information,
    the control unit changing one or more driving parameters.
    the control unit sending changed driving parameters to the circuits,
    the control unit storing the driving parameters, the plant yield control unit sending growth and/or quality information to the control unit, c)—the control unit performing steps b) until a predetermined level of growth and/or quality is reached d)—the control unit sending driving parameters to the control unit for driving the cultivation plant.

Here, the full-scale production plant further optimizes driving parameters and stores information that can be used for optimization in the training control environment.

According to one example, the method further comprises the following step:

d1)—the control unit performing steps b) minimizing one or more of the driving parameters until the growth and/or quality deviates negatively from the predetermined level of growth and/or quality.

Here, the control unit can optimize a minimum use of resources in the circuits in the same manner as stated above in connection to the training control unit.

According to one example, the method further comprises the steps of:

the control unit sending driving parameters and correlated information on growth and/or quality to the training control unit.

Here, the driving parameters and correlated information can be used as starting data for the training control unit in the training environment and/or may be used by the training control unit when further optimizing the driving parameters in the training environment. It should be noted that even if the training environment comprises the same circuits as the full-scale production plant there may be differences in the setup of the plants that need to be taken into account. Information on driving parameters and correlated growth and/or quality from the control unit to the training control unit helps the training control unit to take these differences into account when optimizing the parameters further in the training environment. Hence, the training control unit can already during the training cycle apply empiric data on differences and find driving parameters that are optimal for the training environment and change the parameters based on the differences such that the parameters fit better in the full-scale production plant.

The optimization method is intended to be used in a cultivation plant comprising a cultivation room comprising an air circuit, a water circuit, a heat circuit, a light circuit, a nutrition circuit and a spacing circuit, the cultivation plant comprising a control unit configured to control the circuits, the cultivation room comprising a plant bed for plants and a plant yield control unit configured to give input on at least growth and/or quality of the plants to the control unit, the control unit being configured to store driving parameters for the circuits and correlated input from the yield control unit, wherein the cultivation plant comprises an adjacent facility frequented by carbon dioxide generating entities, the adjacent facility being arranged adjacent the cultivation room, wherein the air circuit comprises an intake conduit configured to lead air from the adjacent facility to the air circuit, wherein the air circuit comprises a dehumidification unit configured to dehumidify air in the air circuit, wherein the dehumidification unit comprises an air inlet configured to receive air from the air circuit and an air outlet configured to feed dehumidified air to the plant bed, wherein the dehumidification unit comprises a water outlet configured to feed condensed water to a water inlet of the water circuit that in turn comprises a water outlet that feeds water to an inlet of the nutrition circuit that in turn comprises an outlet that feeds nutrition water to the plant bed, wherein the dehumidification unit comprises a heat circuit exchanging heat with the adjacent facility, wherein the plant bed comprises cultivation profiles extending in a length direction, a width direction and a height direction, wherein each cultivation profile comprises a bottom wall extending in the width direction and the length direction and side walls connected to each side of the bottom wall and extending in the length direction and the height direction, wherein the bottom wall is configured to lead the water in and out from the water circuit, wherein the cultivation profile comprises a top wall opposing the bottom wall and covering the side walls, wherein the top wall comprises openings for receiving plants to be cultivated, wherein the light circuit is configured to feed light to the plant bed, wherein the spacing unit is configured to space plants apart in the plant bed over time.

Here, it should be noted that it is advantageous to use recourses such as carbon dioxide and energy from the adjacent facility, but the optimization method in the training environment need not comprise an adjacent facility. It is possible to use a different carbon dioxide source and/or energy from a different source as substitute when training the parameters. However, an adjacent facility may be part of the training environment.

The full-scale environment is described below, but the training environment is built up in a similar manner so the description of the full-scale environment is valid also for the training environment.

In the full-scale production environment, utilizing carbon dioxide from the adjacent facility removes or at least decreases the need for adding carbon dioxide from a separately filled canister with carbon dioxide as is usual in prior art. The adjacent facility is advantageously a store occupied with people that expels carbon dioxide by breathing. The carbon dioxide rich air is fed to the cultivation room and thus to the plants. The plants utilize the carbon dioxide in its photosynthesis and expels oxygen and water vapor. The oxygen rich and humid air in the cultivation room can be fed back to the adjacent facility and the people occupying the adjacent facility gets fresh humid air that also smells good due to the scent given by the plants. However, the main part of the oxygen and humid air in the cultivation room is fed to the dehumidification unit that dehumidifies the air and collects condensed water back to the water circuit, thereby minimizing the need for added water from outside the water circuit to the plants. The condensed water is mixed with excess water from the plant bed and analyzed for nutrition content in the nutrition circuit. Data from the analysis in the nutrition circuit is fed to the control unit that determines whether nutrition should be added to the water or not before the water is fed back to the plant bed. The control unit also determines and controls if and how much of the air in the cultivation room that should be fed to the adjacent facility. The control unit also determines and controls the dehumidifier and to what extent the air in the cultivation room should be dehumidified.

Here, there is an additional circuit, the spacing circuit, that is configured to space apart the plants during its growth from a seeding plant to a ready plant. The spacing is important in order to enable a compact and space efficient plant bed. The spacing is further important to give the increasingly growing plants space as they grow larger. The control unit is configured to find the optimum spacing in correlation with the parameters in the other circuits.

The plant bed comprises a number of cultivation profiles arranged side by side with one side wall of one cultivation profile facing one side wall of an adjacent cultivation profile, wherein the cultivation profiles are arranged to move along the plant bed over time with an increasing distance between them over time. Here, the spacing circuit is configured to space apart the cultivation profiles and thereby increasing the distance between the plants over time.

According to one example, the plant bed comprises a table like frame structure extending in a width direction and a length direction onto which the cultivation profiles can be transported in a production direction going from a starting end to final end of the frame structure. The width direction and the length direction describes a plane that can be either horizontal or somewhat inclined with reference to a horizontal plane. The structure comprises transporting means for spacing the cultivation profiles over time in the production direction. The cultivation profiles are initially packed side-by-side when the plants and thus the cultivation profiles are placed on plant bed, i.e. at the start. The cultivation profiles are then moved along the frame structure to give place to new cultivation profiles placed at the start of the plant bed. Dependent on what type of plants and the speed of growth, the cultivation profiles are spaced apart along the frame structure. Hence, all cultivation profiles are moved along the plant bed on the frame structure in the production direction, but with different speed. The cultivation profiles positioned at the start of the plant bed is moved along with less speed than cultivation profiles further down the production direction. Here, speed refers to either a continuously and increasing motion or to an incremental motion where the cultivation profiles are moved in a step wise motion with an increasing space for each step along the production direction. The transporting means can be any suitable transport means that allows for transporting the cultivation profiles. For example, the transport means may comprise a motor and driving means connected to the motor and the cultivation profiles, wherein the driving means transport the cultivation profiles when the motor is activated. The motor can be hand driven and/or electrically driven and/or a mechanical device driven by a motor or by hand.

According to one example, the spacing circuit comprises an elevator means configured to elevate cultivation profiles from a first plant bed level to a second plant bed level in a height direction being essentially vertical. The plant bed comprises a frame like structure extending in the height direction and is advantageously connected to the table like frame structure of the two plant beds for stability. The elevator means can be connected to the frame structure or can be arranged separately as long as the elevator means can elevate the cultivation profile from the first plant bed to the second plant bed. The elevator means can be any suitable transport means that allows for transporting the cultivation profiles. For example, the elevator means may comprise a motor and driving means connected to the motor and the cultivation profiles, wherein the driving means transport the cultivation profiles when the motor is activated. The motor can be hand driven and/or electrically driven and/or a mechanical device driven by a motor or by hand.

According to one example, the cultivation profiles are arranged offset to each other with relation to adjacent cultivation profiles. The offset arrangement gives a triangular geometry between two plants in one cultivation profile and a third plant in an adjacent cultivation profile. The offset arrangement allows for optimum space between the plants and the spacing can be decided dependent on type of plants.

The openings in the cultivation profiles are arranged with openings corresponding to choice of grow media. The grow media is advantageously made from an inert material able to absorb and hold nutrition, and able to hold a plant seed and the plant during growth. The grow media can be arranged in any type of shape and size dependent on type of plant.

According to one example, the air outlet of the dehumidification unit comprises air distribution units arranged in the plant bed structure and configured to control the mass flow and air speed of the air fed directly to the plant bed and thus to be able to control macro, mezzo and microclimate. This to obtain optimal conditions for plant growth, i.e. yield. The control unit is arranged to control the mass flow and air speed of the air. The air circuit may comprise sensors configured to measure the mass flow and air speed in any position of the air circuit. The dehumidification unit may thus comprise such sensors and/or the sensors are positioned in the plant bed and/or in or in the vicinity of the air distribution units.

According to one example, the air circuit comprises air distribution units arranged in the plant bed structure and configured to control the mass flow and air speed of the air fed directly to the plant bed and thus to be able to control macro, mezzo and microclimate. This to obtain optimal conditions for plant growth, i.e. yield. The control unit is arranged to control the mass flow and air speed of the air. The air circuit may comprise sensors configured to measure the mass flow and air speed in any position of the air circuit. The air circuit may thus comprise such sensors and/or the sensors are positioned in the plant bed and/or in or in the vicinity of the air distribution units. The air circuit is thus configured with air distribution units that is fed air from the dehumidification unit and/or a separate air feeding unit, for example a fan or the like, for controlling the mass flow and air speed to the air distribution units.

According to one example, the air outlet of the dehumidification unit and/or the air circuit comprises air blending distribution units are positioned outside the plant bed and configured to create an air motion outside the plant bed for blending different air fractions with different temperatures to a blend. The air circuit is thus configured with air blending distribution units that is fed air from the dehumidification unit and/or a separate air feeding unit, for example a fan or the like, for controlling the mass flow and air speed to the air distribution units.

According to one example, the air circuit comprises valves and/or air pumps connected to the control unit such that the control unit can receive information from the valves and pumps regarding their current state. The valves and/or pumps may comprise sensors such that the control unit can send driving information to the valves and/or pumps for regulating air speed and/or mass flow to the various parts in the air circuit, i.e. e.g. to the plant bed via the air distribution units and/or the air blending distribution units and/or the adjacent facility. The air circuit also comprises fluid conductors for guiding air in the air circuit. It should be noted that the air in the cultivation room is part of the air circuit. When activated, the air in the adjacent facility is part of the air circuit. Here, activated refers to that air from the adjacent facility is fed to the cultivation room and/or that air from the cultivation room is fed to the adjacent facility. The control unit controlling the air circuit may use calculations for computational fluid dynamics for optimum feeding of air to the plants According to one example, the light circuit is configured to feed light to the plant bed and excess heat to the adjacent facility.

One advantage here is that the heat circuit can regulate heat in the plant bed by shifting excess heat from the light circuit and/or the air circuit, i.e. the air dehumidification unit, to the adjacent facility. Furthermore, should the plant bed have a too low temperature, the heat circuit can heat up the air surrounding the plant bed by using heat from the adjacent facility and/or the air circuit, i.e. the air dehumidification unit and/or the light circuit.

The cultivation room should be a closed room with a controlled environment being dependent on the circuits. Here, closed refers to that the room is a space enclosed by one or more walls. For example, spherical room has one spherical wall enclosing the space and a box-like room typically has four walls, a floor and a room. Hence, the geometrical shape is a design feature but the closed room shall be arranged such that the environment in the cultivation can be controlled with regard to e.g. heat, carbon dioxide, light, humidity, air motion regardless of the environment outside the cultivation room. The cultivation room shall also be arranged such that it is sheltered from the ecosystem of the environment outside the cultivation room to hinder e.g. non-wanted seeds and bugs from entering the cultivation room.

In all the above examples, the cultivation plant may comprise sensors in one or more of the circuits. The air circuit may comprise humidity sensors configured to measure the humidity in the cultivation room. The air circuit may comprise temperature sensors configured to measure the temperature in the cultivation room. The air circuit may comprise carbon dioxide sensors configured to measure the carbon dioxide level in the cultivation room. The water circuit may comprise heat sensors configured to measure the temperature of the water fed to the plant bed. The nutrition circuit may comprise nutrition sensors configured to measure the nutrition level of one or more nutrition of the water fed to the plant bed. The heat circuit may comprise temperature sensors configured to measure the temperature in the cultivation room. The light circuit may comprise light sensors configured to measure various aspects of the light in the cultivation room. The light circuit may comprise temperature sensors configured to measure heat from the lights in the cultivation room. The spacing circuit may comprise spacing sensors configured to measure spacing of the cultivation profiles in the plant bed. The sensors can be arranged in the vicinity of the plants and/or at a distance from the plants. The yield control unit may comprise sensors configured to measure growth and/or quality of the plants. The sensors can be any suitable sensors. All sensors are connected to the control unit such that the control unit can receive information from the sensors and send driving information to the circuits.

The control unit can be a distributed control unit with a central control unit and one or more control units in each circuit that receives information from the sensors and sends information to the central control unit and then receives driving information from the central control wherein the one or more control units in each circuit drives the different circuits accordingly. As an alternative, the control unit can be a central control unit that receives information from the sensors and then drives the different circuits accordingly.

It should be noted that the heat circuit may comprises valves and fluid conductors controlled by the control unit configured to control excess heat from the cultivation room to a heat storage in the adjacent facility and/or to a separate energy storing unit. The separate energy storing unit may be in the form of a circuit buried in the ground and/or a borehole in the ground and/or a phase changing material and/or any other suitable heat/energy storing means. The heat storage and/or the separate energy storing unit in the adjacent facility may be in the form of phase changing material and/or an insulated liquid container and/or a transformation device transforming heat to electricity that can be stored in electrical storage means, e.g. a battery, or be fed to the power grid acting as a storage means.

As mentioned above, the adjacent facility refers to an environment where carbon dioxide is generated. One example here is that the adjacent facility can be a house with one or more apartments and/or a collection of houses exchanging air with the cultivation plant via the air circuit according to the above. The cultivation plant can be arranged integrated with the adjacent facility and/or adjacent the adjacent facility. The above described heat storage and/or the separate energy storing unit can be used for exchanging heat with one or more of the circuits in the cultivation plant. For example, the dehumidifier comprises a heat exchanger with a cool side that cools down the air to be dehumidified and can be driven by a compressor creating a cooling circuit in the heat exchanger, but the cooling circuit can be driven entirely, or in combination with a compressor, by adding a cool medium to the cool side. The above discussed separate energy storing unit can be in the form of a borehole that comprises a heat exchanger device extracting heat from the borehole to be used in the adjacent facility. Such a device extracts heat from the temperature difference in the borehole and the heat exchanger. Normally such a borehole has a fairly low temperature that could be used for extracting a low temperature to a cooling medium to the cool side of the dehumidifier, which saves energy. As mentioned above, the borehole can be heated with excess heat from the cultivation plant which creates a beneficial circuit where the adjacent facility can benefit from the excess heat and the cultivation plant can benefit from the cool medium in the dehumidifier. It should be noted that borehole is just an example, and that other separate energy storing units can be used.

Furthermore, the dehumidifier can be driven on the cool side by the air circuit comprising valves and conduits for using cool air from outside the cultivation plant, for example during winter time, which saves energy. Here, a heat exchanger could be beneficial to separate outside air from the air in the cultivation plant in order to hinder foreign particles and insects to enter the cultivation plant. As an alternative, or complement, the air circuit comprises one or more filters that hinders foreign particles and insects to enter the cultivation plant from outside air or from air in the adjacent facility.

The cultivation plant may be configured to be operated during low utilization of the power grid in order to avoid further load on the power grid during peak hours.

BRIEF DESCRIPTION OF DRAWINGS

The invention will below be described in connection to a number of drawings, in which:

FIG. 8 schematically shows a top view of a cultivation profile in FIGS. 1-7, and wherein;

DETAILED DESCRIPTION

The invention will below be described in connection to a number of non-exclusive embodiments. Like features will be denoted with like numbers. In order to facilitate the description of the embodiments, a three dimensional Cartesian orthogonal coordinate system has been used where the X-axis is denoted length direction, the Y-axis is denoted width direction and where the Z-axis is denoted height direction.

Figure 1:
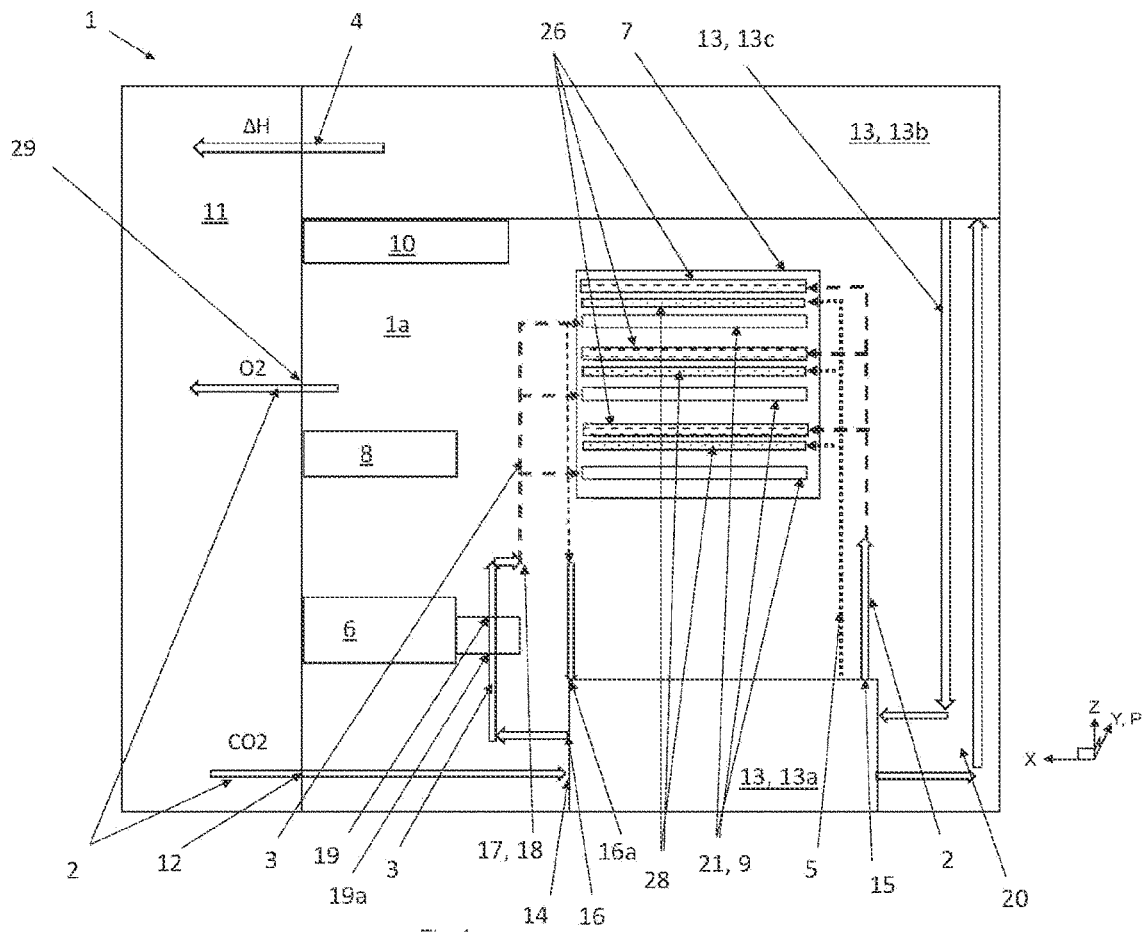
FIG. 1 schematically shows an overview of a cultivation plant with an adjacent facility according to one example.
Figure 2:
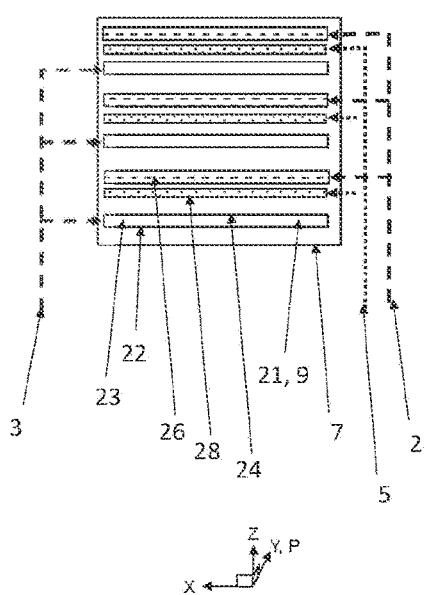
FIG. 2 schematically shows a side view of a plant bed seen in a longitudinal direction according to one example shown in FIG. 1.
Figure 3:
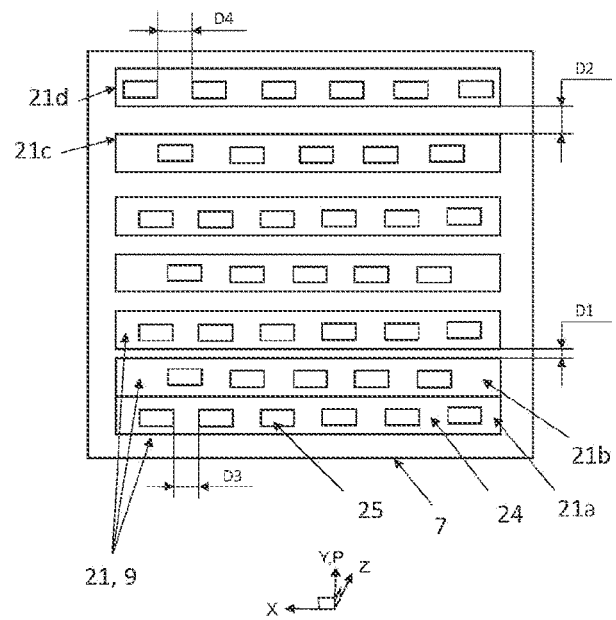
FIG. 3 schematically shows a top view of one layer of a plant bed according to one example shown in FIGS. 1 and 2.
Figure 4:
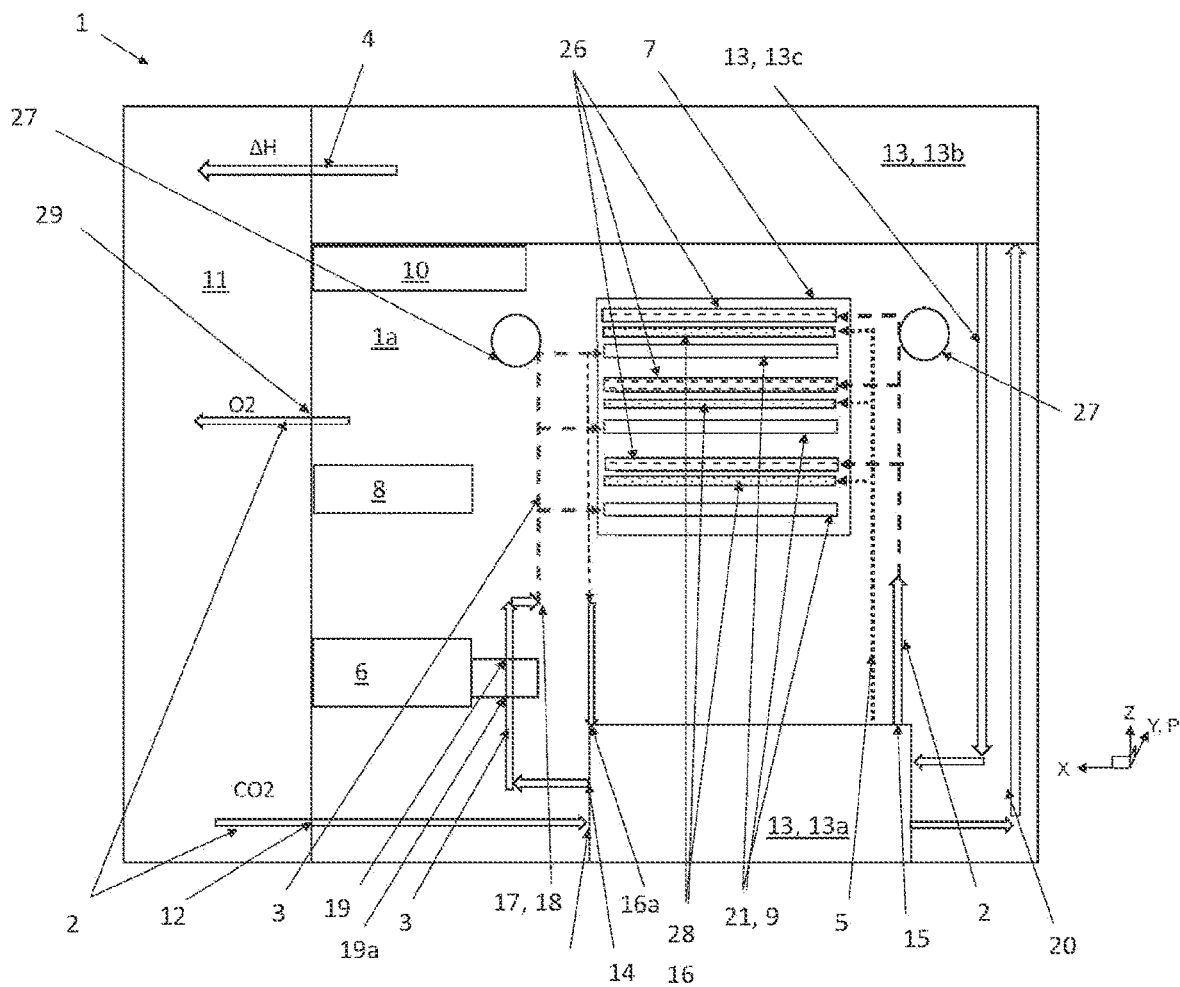
FIG. 4 schematically shows an overview of a cultivation plant and an adjacent facility according to one example.
Figure 5:
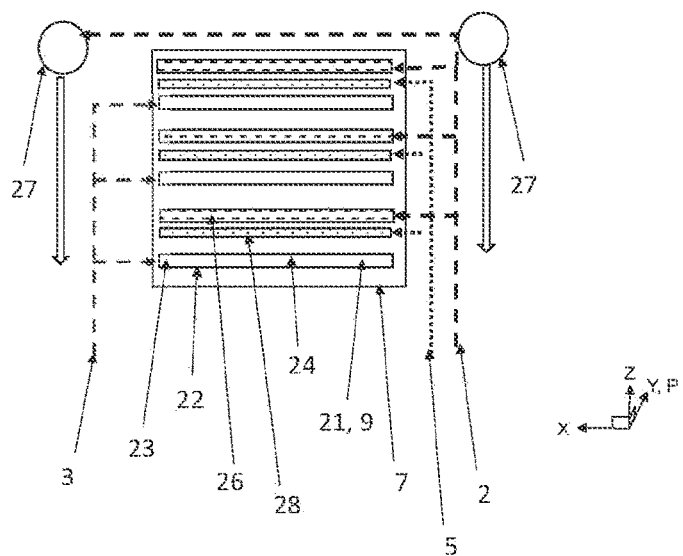
FIG. 5 schematically shows a side view of a plant bed seen in a longitudinal direction according to the example in FIG. 4.
Figure 6:
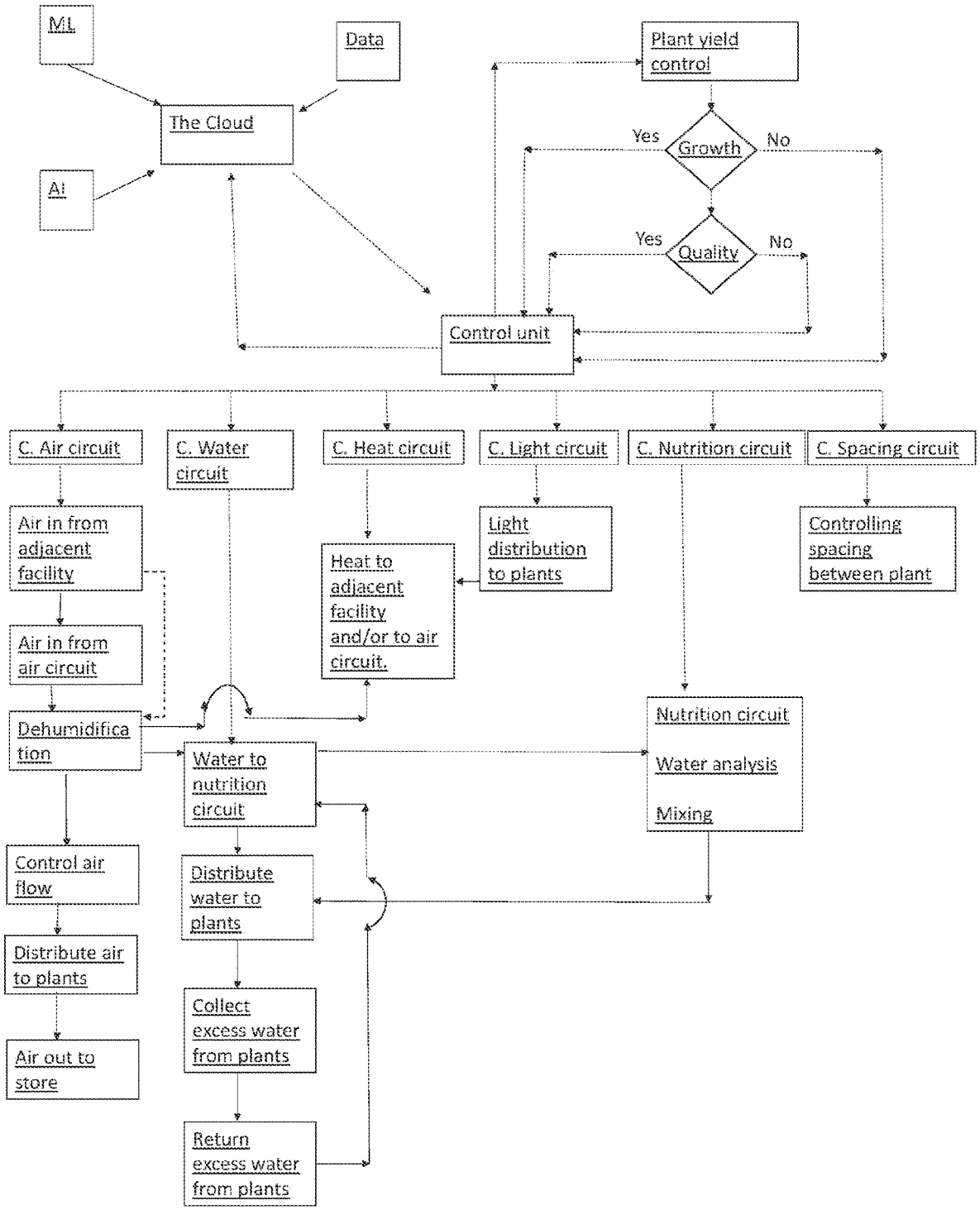
FIG. 6 schematically shows a flow chart of a cultivation plant according to FIGS. 1-5.
Figure 7:
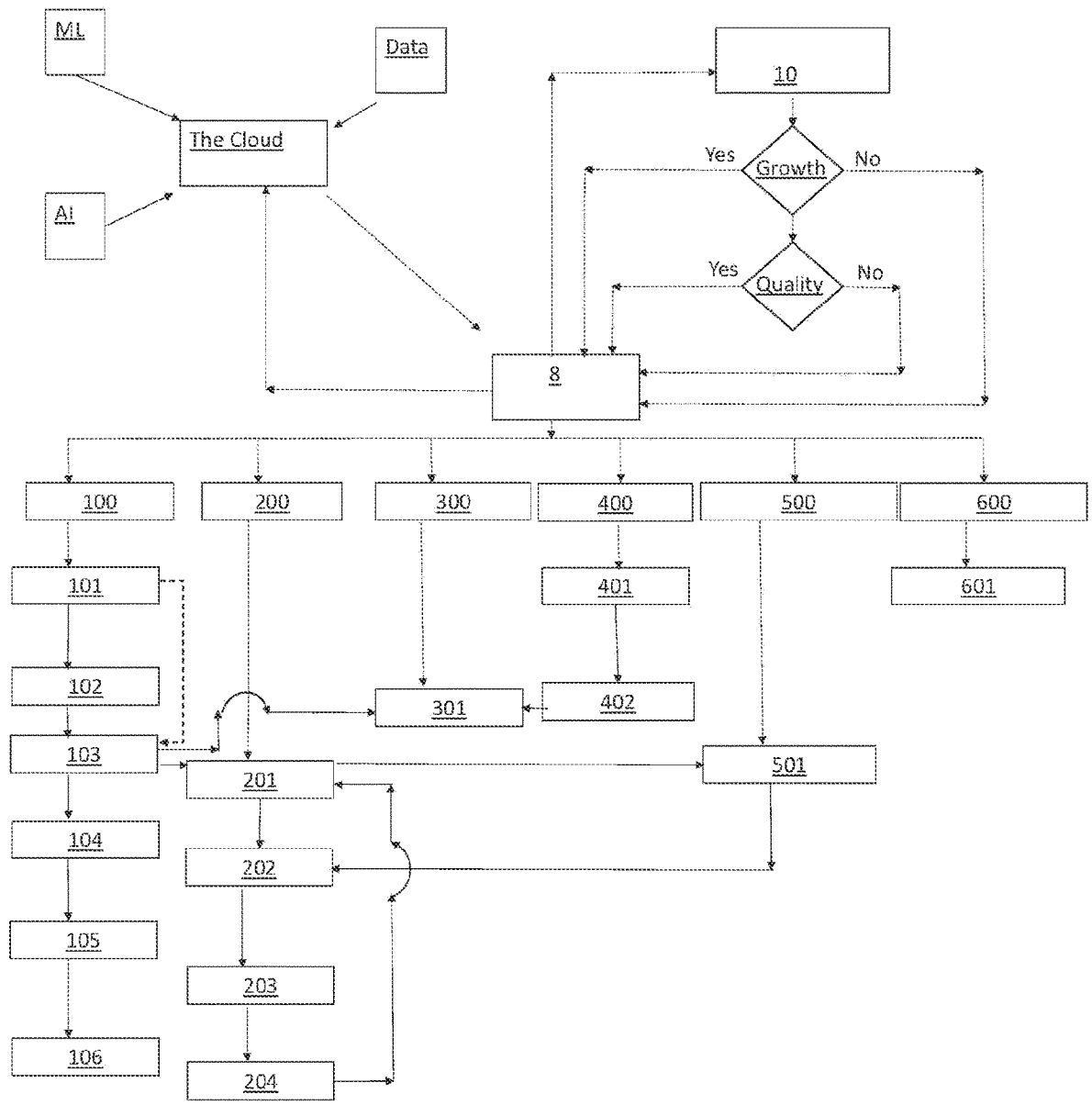
FIG. 7 schematically shows a flow chart of a cultivation plant according to FIGS. 1-6.
Figure 8:
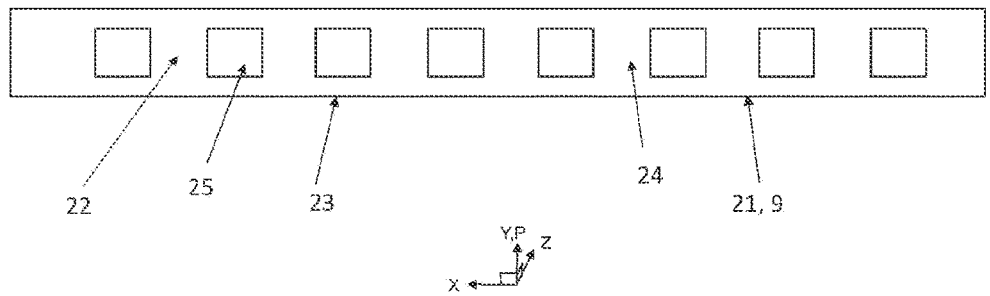
Figure 9:
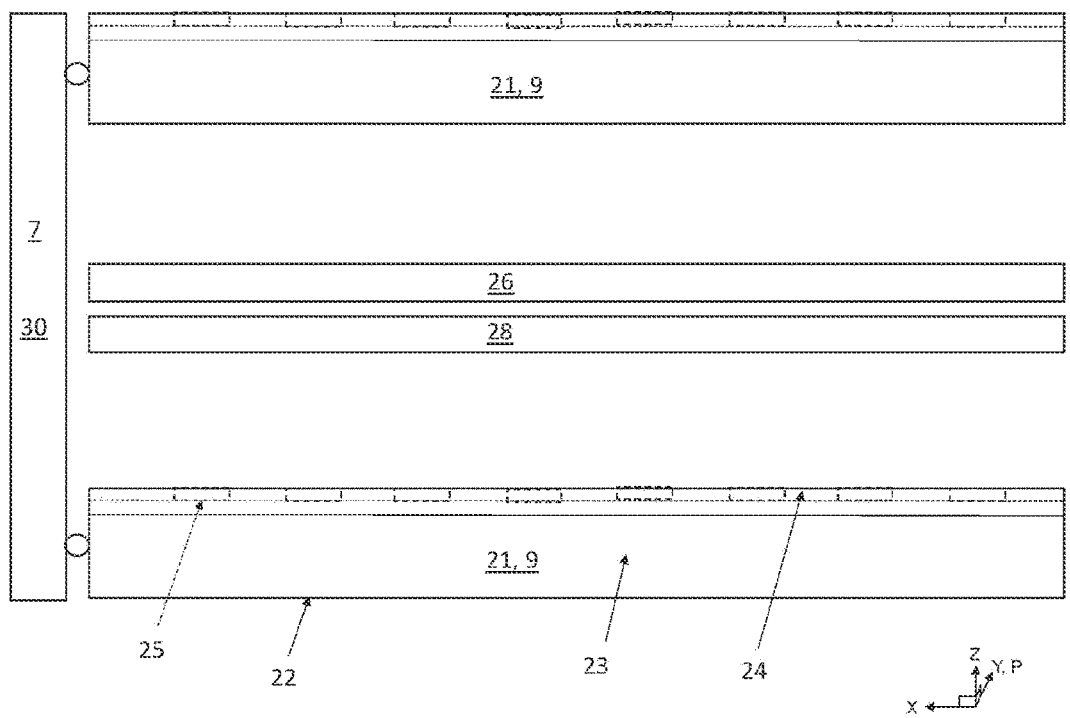
FIG. 9 schematically shows a side view of a plant bed in FIGS. 1-7.

FIG. 1 schematically shows an overview of a cultivation plant 1 with a cultivation room 1a with an adjacent facility 11 according to one example. FIG. 2 schematically shows a side view of a plant bed 9 seen in a longitudinal direction X according to one example shown in FIG. 1. FIG. 3 schematically shows a top view of one layer of a plant bed 9 according to one example shown in FIGS. 1 and 2. FIG. 4 schematically shows an overview of a cultivation plant 1 with an adjacent facility 11 according to one example. FIG. 5 schematically shows a side view of a plant bed 9 seen in a longitudinal direction X according to the example in FIG. 4. FIGS. 6 and 7 schematically show a flow chart of a cultivation plant 1 according to FIGS. 1-5. FIG. 8 schematically shows a top view of a cultivation profile 21 in FIGS. 1-7. FIG. 9 schematically shows a side view of a plant bed 9 in FIGS. 1-7 seen in the production direction P, Y.

Here, it should be noted that it is advantageous to use recourses such as carbon dioxide and energy from the adjacent facility, but the optimization method in the training environment need not comprise an adjacent facility. It is possible to use a different carbon dioxide source and/or energy from a different source as substitute when training the parameters. However, an adjacent facility may be part of the training environment.

The full-scale environment is described below in connection to FIGS. 1-9, but the training environment is built up in a similar manner so the description of the full-scale environment is valid also for the training environment.

With reference to FIGS. 1-9 the cultivation plant 1 comprises a cultivation room 1a comprising an air circuit 2, a water circuit 3, a heat circuit 4, a light circuit 5, a nutrition circuit 6 and a spacing circuit 7, the cultivation plant 1 comprising a control unit 8 configured to control the circuits, the cultivation room 1a comprising a plant bed 9 for plants and a plant yield control unit 10 configured to give input on at least growth and/or quality of the plants to the control unit 8, the control unit 8 being configured to store driving parameters for the circuits and correlated input from the yield control unit 10, wherein the cultivation plant 1 comprises an adjacent facility 11 frequented by carbon dioxide generating entities, the adjacent facility 11 being arranged adjacent the cultivation room 1a, wherein the air circuit 2 comprises an intake conduit 12 configured to lead air from the adjacent facility 11 to the air circuit 2, wherein the air circuit 2 comprises a dehumidification unit 13 configured to dehumidify air in the air circuit 2, wherein the dehumidification unit 13 comprises an air inlet 14 configured to receive air from the air circuit 2 and an air outlet 15 configured to feed dehumidified air to the plant bed 9, wherein the dehumidification unit 13 comprises a water outlet 16 configured to feed condensed water to a water inlet 17 of the water circuit 3 that in turn comprises a water outlet 18 that feeds water to an inlet 19a of the nutrition circuit 6 that in turn comprises an outlet 19 that feeds nutrition water to the plant bed 9, wherein the dehumidification unit 13 comprises a heat circuit 20 exchanging heat with the adjacent facility 11, wherein the plant bed 9 comprises cultivation profiles 21 extending in a length direction X, a width Y direction and a height direction Z, wherein each cultivation profile 21 comprises a bottom wall 22 extending in the width direction Y and the length direction X and side walls 23 connected to each side of the bottom wall 22 and extending in the length direction X and the height direction Z, wherein the bottom wall 22 is configured to lead the water in and out from the water circuit 3, wherein the cultivation profile 21 comprises a top wall 24 opposing the bottom wall 22 and covering the side walls 23, wherein the top wall 24 comprises openings 25 for receiving plants to be cultivated, wherein the light circuit 5 is configured to feed light to the plant bed, wherein the spacing unit 7 is configured to space plants apart in the plant bed 9 over time.

One advantage here is that carbon dioxide $CO_2$ is fed from the adjacent facility 11 to the cultivation plant 1 thereby removing or at least decreases addition of stored $CO_2$ from a canister. The adjacent facility 11 is advantageously an in-house store occupied by customers that consumes oxygen via breathing and in a known manner and expels $CO_2$. The adjacent facility 11 may also be an in-house animal farm that generates an excess of $CO_2$. According to another example, the adjacent facility 11 comprises one or more machines that expels $CO_2$. The adjacent facility 11 may comprise a carbon capture and storage device for capturing and storing $CO_2$.

Further advantage is that the heat circuit 4 can regulate heat in the plant bed 9 by shifting excess heat from the light circuit 5 and/or the air circuit 2, i.e. the air dehumidification unit 13, to the adjacent facility 11. Furthermore, should the plant bed 9 have a too low temperature, the heat circuit 4 can heat up the air surrounding the plant bed 9 by using heat from the adjacent facility 11 and/or the air circuit 2. i.e. the air dehumidification unit 13 and/or the light circuit 5.

According to one example, the air circuit 2 comprises an outlet conduit 29 configured to lead air from the air circuit 2 to the adjacent facility 11.

Yet an advantage is that the adjacent facility not only contributes with CO2 to the plants, but the oxygen O2 rich air can be returned to the adjacent facility giving a better and more oxygen rich environment. Yet another advantage here is that the air in the plant bed smells good from the plants which gives further improved air environment in the adjacent facility.

The cultivation room 1a is a closed room with a controlled environment dependent on the circuits.

The adjacent facility is advantageously separated from the plant bed via walls and/or filters that hinder unwanted seeds, insects, animals, bacteria etc. from the plant bed giving the plant bed a controlled environment. The environment is controlled by the control unit, which will be explained further below.

The plant yield control unit 10 is configured to give input to the control unit on growth and/or quality of the plants to the control unit 8. According to one example, the plant yield control unit 10 comprises one or more sensors, not shown, configured to monitor a plant over time. The sensor or sensors may be configured to monitor color, height, width, weight, smell, taste, density, etc. The plant yield control unit can also be a manual station where an operator checks the status of the plant over time and inputs data to the control unit.

The control unit 8 is configured to store driving parameters for the circuits and correlated input from the yield control unit 10. The control unit can be any computing device with data storage and data processing capabilities. The control unit comprises a storage means that can store correlated data over time. For example, the correlated data can be in the form of a chart of parameters. Some parameters may be predetermined driving parameters for all the above-mentioned circuits and correlated input data from the plant yield control unit 10. According to one example, the control unit comprises an optimization program configured to optimize the driving parameters of the circuits dependent on input form the plant yield control unit 10. The optimization program may be configured as an artificial intelligence allowed to vary the driving parameters dependent on the input parameters from the plant yield control unit 10 or may have restrictions on certain or all driving para that only allows for a range within which the driving parameters may vary.

The dehumidification unit 13 is configured to dehumidify the incoming air and the dehumidification unit 13 comprises an air inlet 14 configured to receive air from the air intake conduit 12 and an air outlet 15 configured to feed dehumidified air to the plant bed 9. The dehumidification unit 13 comprises a water outlet 16 configured to feed condensed water to a water inlet 17 of the water circuit 3 that in turn comprises a water outlet 18 that feeds water to an inlet 19a of the nutrition circuit 6 that in turn comprises an outlet 19 that feeds nutrition water to the plant bed 9. One advantage here is that the recirculated water does not leave the water circuit, except for bound water in the plant and, when appropriate, moist air is fed to the adjacent facility, which greatly diminishes the need for feeding water from the outside of the water circuit. Water fed to the water circuit is only necessary for a small amount of water to compensate for the water that leaves the water circuit. Experiments have shown that an open outside plant bed has a need of ca 250 times than what is needed for the water circuit 3 according to the invention.

The dehumidification unit 13 comprises a low-pressure end 13a connected in fluid communication via conduits 13c with a high-pressure end 13b. The high and low pressure ends 13a, 13b drives a compressible medium in a heating and cooling cycle 20. The high-pressure end 13b compresses the medium which gives off heat in a heat exchanger. The low-pressure 13a end allows the medium to expand and thus cools down the incoming air via a heat exchanger that also comprises a condensation portion that receives the condensed from the cooled air. The heat in the high-pressure end can be fed to the adjacent facility or to the plant bed 9 dependent on where it is most needed. The evaporative cooling effect in the plants may in some instances give a too cool plant bed which can be controlled by feeding excess heat, i.e. heat already used produced by the light circuit 5 or the dehumidification unit 13, to the plant bed. The dehumidification unit 13 thus comprises a heat circuit 20 exchanging heat with the adjacent facility 11 and/or to the plant bed 9 and is controlled by the control unit 8. The high-pressure end is positioned either in the adjacent facility or in the room with the plant bed. It is a design choice that takes into account a number of parameters, for example type of adjacent facility, type plants and how much evaporative cooling there is, and cost for e.g. piping.

The plant bed 9 comprises cultivation profiles 21 extending in a length direction X, a width Y direction and a height direction Z, wherein each cultivation profile 21 comprises a bottom wall 22 extending in the width direction Y and the length direction X and side walls 23 connected to each side of the bottom wall 22 and extending in the length direction X and the height direction Z. The bottom wall 22 and the side walls form a channel like configuration configured to lead the water in and out from the water circuit 3.

The cultivation profile 21 comprises a top wall 24 opposing the bottom wall 22 that covers the side walls 23. The top wall 24 comprises openings 25 for receiving plants to be cultivated. The openings can vary in size and form dependent on type of plants.

The light circuit 5 is configured to feed light to the plant bed and excess heat can be used in the heat circuit 20. The light circuit 5 comprises light emitting units with suitable frequency dependent on plants and is positioned above the plants for optimum light energy transmittance to the plants. The light emitting units are preferably in the form of Light Emitting Diods. LEDs, in order to save energy and the quality of the LEDs are important dependent on type of plant. The position, intensity and color, i.e. the quality and quantity, of the light emitting units can be varied in all three room dimensions and over time and is controlled by the control unit.

The spacing unit 7 is configured to space plants apart in the plant bed 9 over time. The spacing unit can be configured to space apart the cultivation profiles 21 and/or the openings 25 in the top wall 24. FIG. 3 shows that the plant bed 9 comprises a number of cultivation profiles 21 arranged side by side with one side wall 23 of one cultivation profile 21 facing one side wall 23 of an adjacent cultivation profile 21, wherein the cultivation profiles 21 are arranged to move along the plant bed 9 structure over time with an increasing distance between them over time. FIG. 3 schematically shows that over time the cultivation profiles 21 are separated in a production direction P that coincides with the width direction Y. FIG. 3 shows that the two first the cultivation profiles 21a, 21b are arranged immediately next two each other and that the second and third the cultivation profiles 21 are separated by a distance D1 and that the last two cultivation profiles 21c, 21d are separated by a distance D2 being greater than the distance D1. The plant bed 9 is configured to allow planting new plants in the first cultivation profile 21a and then the profile is moved in the production direction giving space for a new first cultivation profile 21. Hence, there is a continuous operation of feeding cultivation profiles 21 to the plant bed 9 and moving existing cultivation profiles 21 in the production direction with increased spacing over time that depends on the growth of the plants. It should be noted that there is an ideal separation between plants to allow air and light to reach relevant portions of each plant. The ideal separation depends on a number of factors dependent on type of plants. The spacing between plants is further important for saving space in the plant bed and at the same time allow beneficial growth of the plants.

According to one example, the plant bed 9 is arranged to feed new plants in new cultivation profiles 21 on one side and then to harvest the ready plants on the other side of the plant bed taken in the production direction P.

According to one example, the spacing circuit 7 comprises an elevator means 30, see FIG. 9, configured to lift the last cultivation profile 21 from its existing first level to a second level above or below the first level. The spacing circuit 7 may here be configured to feed the cultivation profiles 21 in the second level in a direction opposite the production direction in the first level. One advantage with this arrangement is that a user may plant crops at one side and feed cultivation profiles 21 to the plant bed 9 in the production direction at the first level and then harvest the plants from the second level and from the same side of the plant bed that was used for planting. A further advantage is that the plant bed is configured with two or more plant bed levels that allows for a compact plant bed 9 arranged in the height direction Z.

FIGS. 1, 2, 4 and 5 schematically show that the plant bed 9 comprises three levels and FIG. 9 shows that the plant bed 9 comprises two levels, but FIG. 3 shows one level of a plant bed. Hence, the plant bed 9 comprises at least one level, but may comprise two or more levels with the above stated advantages and dependent on desired operation.

FIG. 3 schematically shows one layer of the plant bed 9 where the openings 25 in the cultivation profiles 21 are arranged offset to each other with relation to adjacent cultivation profiles 21. As can be seen in FIG. 3, two openings 25 in the first cultivation profile 21a are arranged with a distance D3 between them and an opening 25 in the second cultivation profile 21b is positioned at least partly between the openings 25 in the first cultivation profile creating what could be described as a triangular arrangement.

FIG. 3 schematically shows that the spacing circuit 7 is configured with spacing means that separates the openings 25 in each cultivation profile 21 over time in the longitudinal direction X. Hence, the openings 25 in each cultivation profile 21 are arranged to be spaced apart over time by means of the spacing circuit 7. In FIG. 3 this is shown by that the openings 25 in the first cultivation profile 21a are spaced apart with a distance D3 and that the openings 25 in the last cultivation profile 21d are spaced apart with a distance D4 being greater than D3.

However, according to another example, see e.g. FIG. 8, the openings 25 in each cultivation profile 21 are arranged in a fixed relation to each other over time. Furthermore, the cultivation profiles 21 are arranged with openings 25 corresponding to plant variety. The openings 25 keep the plants in an upright position. The top wall acts as a lid that keeps the light from reaching the nutrient rich water that flows on the bottom, which otherwise would cause algae growth. The size of the openings depends on chosen grow media, preferable in the form a substrate. There is an advantage to use as little substrate as possible to reduce ecological footprint. Furthermore, biodegradable materials are preferred as substrate for the plants to grow in.

FIGS. 1, 2, 4, 5 and 9 show that the air outlet 15 comprises air distribution units 28 arranged in the plant bed 9 and configured to control the mass flow and air speed of the air fed directly to the plant bed 9. Here, it is important to control the mass flow and air speed such that an optimum of air exchange takes place in connection to the plants without disturbing the growth of the plants by the wind being so strong that it affects the plants to move too much. The air exchange is important to introduce carbon dioxide $CO_2$ rich air to the plants for the photosynthesis, but also to transport moist and oxygen $O_2$ rich air away from the plants. The mass flow and air speed can be different dependent on where in time the process the plants are. For example, a newly planted plant has small, if any, leafs and a more mature plant has more and larger leafs. Hence, the control unit 8 can be configured to take into account the maturing parameters and control the mass flow and air speed in the air distribution units 28 accordingly. Here, the control unit 8 can also be configured to move the air distribution units 28 in different positions for optimum feeding of air to the plants. For example, the air distribution units 28 can be arranged at different height levels above the plants and may distribute air at different angles to the plants. Adjacent air distribution units 28 can be arranged with an optimum relationship to each other such that air is distributed from different angles and thus creates an air blending current in connection to the plants.

FIGS. 4, 5 and 9 show that the air outlet 15 comprises the above air distribution units 28 and air blending distribution units 27 positioned outside the plant bed 9 and configured to create an air motion outside the plant bed 9 for blending different air fractions with different temperatures to a blend. Warm air rises in the height direction and the air blending distribution units 27 are configured to blow air in the counter direction in order to mix the warm air with colder air below in order to create a more homogenous air temperature in connection to the plant bed 9.

FIG. 6 schematically shows a flow chart of a cultivation plant according to FIGS. 1-5 with text in the boxes for eligibility and FIG. 7 schematically shows a flow chart of a cultivation plant according to FIG. 6 but with numbered boxes.

With reference to FIG. 7:

Box 8 relates to the control unit 8 and that the control unit 8 is connected to the air circuit 2, Box 100, the water circuit 3, Box 200, the heat circuit 4, Box 300, a light circuit 5, Box 400, the nutrition circuit 6, Box 500, the spacing circuit 7, Box 600, and the plant yield control unit 10, Box 10, The control unit 8 is configured to store driving parameters for the circuits and correlated input from the yield control unit 10. The control unit 8 is configured with a memory and a computing entity. The Control unit 8 can be a separate unit configured with all necessary means for receiving information, storing information, computing information and transmitting control signals to the circuits in the cultivation plant. The control unit 8 can alternatively be connected to one or more units for storing and calculating. For example, the control unit can be connected to a distributed storing means being part of the Internet, today such a storing means is often referred to as the Cloud. The control unit 8 may also be connected to a distributed calculating means being part of the Internet. The stored driving parameters is preferably logged with date and time so that changes in the driving parameters can be correlated with input data from the plant yield control unit 10.

Box 10 relates to the plant yield control unit 10 being configured to give input on growth and/or quality of the plants to the control unit 8. As mentioned above, the plant yield control unit 10 comprises means for checking growth and quality. Box 10 shows that growth is a separate parameter and that quality is a separate parameter. A high yield, i.e. growth per time unit, of the plant does not necessarily mean that the quality is good why this is checked as a separate parameter. Here, quality refers to a design parameter set up by the operator of the cultivation plant. It can be color and/or taste and/or texture and/or any other suitable parameter. Furthermore, the plant yield control unit 10 is not limited to measure both growth and quality, but any one of growth or quality can be measured and further yield parameters can be added. The plant yield control unit 10 comprises means for measuring the selected parameters at specific points in time. The chosen points in time are selected such that they correlate with measurements made in one or more of the other circuits, i.e. the stored driving parameters in the control unit 8. The correlation is necessary in order to be able to couple the yield parameters to the stored driving parameters and thus get feedback on changes of the driving parameters in one or more circuits.

One problem with optimizing the growth with relation to the driving parameters is that the effect of a change of one or more driving parameters lags in time. Big data over a long period in time is necessary in order to be able to analyze the data. According to one example, the control unit 8 is configured to change the parameters for an optimum efficiency of water, nutrition, air, heat and light given a predetermined quality and growth of the plants, wherein the control unit 8 is configured to control the circuits based on yield and quality and based on optimum efficiency of each of the circuits and the result of changes in the various circuits are reflected in the yield and quality and minimum use of water, nutrition, air, heat and light and used in a control loop arrangement to further enhance yield and quality and/or efficiency of water, nutrition, air, heat and light.

As can be seen in FIGS. 6 and 7, the control unit can be connected to external devices for storing data and/or calculating data and/or receiving data. The data may for example be driving parameters for the circuits for different plants. The external devices may be The Cloud, which is an Internet based solution with distributed storage possibilities and it may be an Artificial Intelligence, AI, routine for calculating and executing best practice for the cultivation plant and it may be a machine learning, ML, routine for finding and adapting optimum parameters. However, as mentioned above the control unit 8 and/or the test control unit may comprise all means for storing and calculating the data.

Box 100 relates to a control unit for the air circuit 2. The control unit for the air circuit is configured to communicate with the control unit 8. The control unit 8 sends control information to the control unit for the air circuit with information on operation for the air circuit 2.

Box 101 relates to air in from the adjacent facility 11. The air in from the adjacent facility 11 is controlled by the control unit for the air circuit. The air in from the adjacent facility can vary with parameters regarding, e.g., temperature and humidity, and dependent on the parameters the air in from the adjacent facility can be directed directly to the dehumidification unit 13, Box 103, or to the air in the air circuit 2, Box 102, or a combination of the two. According to one example, the air circuit 2 comprises one or more valves that can direct the air from the intake conduit 12 to the air inlet 14 of the of the dehumidification unit 13 and/or directly to the air circuit. Here, it should be pointed out that the air circuit 2 comprises the air in the cultivation room 1a and the control unit for the air circuit can control the air from the adjacent facility directly to the air in the cultivation room 1a and/or to the air inlet 14 of the of the dehumidification unit 13. The control unit for the air circuit may comprise sensors and/or computing means and/or controlling means for controlling the air circuit. The control unit for the air circuit then communicates with the control unit 8 giving information to the control unit 8 on air parameters and settings of the valves and receiving control parameters from the control unit 8. As an alternative, the control unit for the air circuit is part of the control unit 8. The sensors give information to the control unit 8 that in response gives driving parameters to the valve or valves. According to one example, the air circuit comprises a fan or the like for controlling airflow and air speed from the adjacent facility. The fan can be a suction fan and/or a blow fan connected to the intake conduit 12 and is controlled by the control unit for the air circuit.

Box 102 relates to air in from the air circuit 2 to the dehumidification unit 13. As explained above, the air in from the air circuit 2 is controlled by the control unit 8.

Box 103 relates to dehumidification of the air from the air circuit 2 in the dehumidification unit 13. The dehumidification unit 13 is controlled by the control unit 8 according to the above and dehumidifies the air in the air circuit to a predetermined value of a dehumidification parameter. The dehumidification unit 13 is controlled dependent on. e.g., humidity and temperature of the air in the air circuit before being fed to the dehumidification unit 13.

Box 103 shows that the dehumidification unit 13 is configured to feed excess heat to the adjacent facility or to the air circuit 2 via the heat circuit 4, see Box 301. Here, excess heat refers to heat not necessary to use for heating the air circuit 2. Hence, the dehumidification unit 13 is arranged to feed heat to the air circuit 2 and/or the adjacent facility 11 and this is controlled by the control unit 8. The heat circuit 4 thus comprises at least a part of the dehumidification unit 13 or the heat circuit 4 is connected to the dehumidification unit 13 such that heat can be transferred to the heat circuit 4. According to one example, the dehumidification unit 13 and/or the heat circuit 4 may comprise valves and fluid conductors interconnected to allow for the heat to be transported via any suitable liquid and/or gas media. According to one example, the heat circuit 4 is connected to the air circuit 2 which allows for the air circuit 2 to transport heat from the dehumidification unit 13.

Box 103 shows that the dehumidification unit 13 is configured to feed water to the water circuit 3, see Box 201.

Box 103 shows that air is fed to the air circuit 2, see Box 104.

Box 104 relates to the dehumidification unit 13 being configured to control air flow and air speed to the air circuit 2 after the dehumidification. As an alternative, the air circuit 2 comprises air control means configured to control the distribution of the dehumidified air to the air circuit 2, see Box 105.

Box 105 relates to the air circuit comprising air distribution units 26 and, according to some examples, air blending distribution units 27 as discussed above.

Box 106 relates to the air circuit 2 comprising means for feeding air from the cultivation room 1a to the adjacent facility 11.

Box 200 relates to that the water circuit 3 comprises water control means for the water circuit 3. The water control unit is configured to communicate with the control unit 8. The control unit 8 sends control information to the water control unit with information on operation for the water circuit 3.

Box 201 relates to water being fed to the nutrition circuit 3, see Boxes 500 and 501. The water from the dehumidification unit 13 to the water circuit 2 is controlled by the water control unit.

The water in from the dehumidification unit 13 is controlled by the water control means. The water in from the dehumidification unit 13 can vary with parameters regarding, e.g., temperature, acidity, and nutrition, see Boxes 500 and 501. The water circuit 6 comprises return water from the plant bed 9, see Boxes 203 and 204, and the water from the dehumidifier 13, see Box 103, and the mix of water is analysed in the nutrition circuit 6, see Box 500. According to one example, the water circuit 3 comprises one or more valves that can direct the water from the dehumidifier 13 to the nutrition circuit 6 and/or the to the plant bed 9, see Boxes 103 and 501, and return water from plant bed 9, see Box 205.

The water control means may comprise sensors and/or computing means and/or controlling means for controlling the water circuit 3. The water control means then communicates with the control unit 8 giving information to the control unit 8 on water parameters and settings of the valves and receiving control parameters from the control unit 8. As an alternative, the water control means is part of the control unit 8. The sensors give information to the control unit 8 that in response gives driving parameters to the valve or valves. According to one example, the water circuit comprises a pump or the like for controlling water flow in the water circuit. The pump can be a suction pump and/or a pressure pump connected to the dehumidifier and/or the nutrition circuit and is controlled by the water control means.

Box 202 relates to an arrangement and method for distributing water to the plants according to the above. Here, water is returned from the nutrition circuit in Box 201 and distributed to the plants. The water circuit 3 and nutrition circuit 6 are connected so that water from the dehumidification unit 13 is properly mixed with nutrition in the nutrition circuit and analyzed, see Box 501, before being distributed to the plant bed 9. It should be noted that fresh water needs to be added to the water circuit in order to maintain a correct amount of water in the water circuit. The added water can be added anywhere in the water circuit such that the mix of fresh water and return water is fed to and analyzed in the Nutrition circuit 6, see Box 501.

Box 203 relates to an arrangement and method for collecting excess water from plants after Box 202.

Box 204 relates to an arrangement and method for returning excess water from the plants in Box 203 to the arrangement in Box 201.

Box 300 relates to that the heat circuit 4 comprises heat control means for the heat circuit 4. The heat control unit is configured to communicate with the control unit 8. The control unit 8 sends control information to the heat control unit with information on operation for the heat circuit 4. The heat control units may comprise sensors for monitoring the temperature in the cultivation room 1a, see Box 301.

The heat control means may comprise sensors and/or computing means and/or controlling means for controlling the heat circuit 4. The heat control means then communicates with the control unit 8 giving information to the control unit 8 on heat parameters and settings of dehumidification unit 13, see Box 103, and the light circuit 5, see Box 401, receiving control parameters from the control unit 8. As an alternative, the heat control means is part of the control unit 8. The sensors give information to the control unit 8 that in response gives driving parameters to the heat circuit and/or the air circuit.

Box 301 relates to that the heat circuit 4 is controlled to feed excess heat to the adjacent facility or to use the heat to heat up the air in the cultivation room 1a via the air circuit 2.

Box 400 relates to that the light circuit 5 comprises light control means for controlling the light circuit 5. The light control means for the light circuit 5 is configured to communicate with the control unit 8. The control unit 8 sends control information to the light control means with information on operation for the light circuit 5.

The light control means may comprise sensors and/or computing means and/or controlling means for controlling the light circuit 5. The light control means then communicates with the control unit 8 giving information to the control unit 8 on light parameters, see Box 400, and receiving control parameters from the control unit 8. As an alternative, the light control means is part of the control unit 8. The sensors give information to the control unit 8 that in response gives driving parameters to the light circuit and/or the air circuit.

Box 401 relates to the light circuit 5 feeding light to the plants in the plant bed 9.

Box 500 relates to that the nutrition circuit 6 comprises nutrition control means for controlling the nutrition circuit 6. The nutrition control means for the nutrition circuit 6 is configured to communicate with the control unit 8. The control unit 8 sends control information to the nutrition control means with information on operation for the nutrition circuit 6.

The nutrition control means may comprise sensors and/or computing means and/or controlling means for controlling the nutrition circuit 6. The nutrition control means then communicates with the control unit 8 giving information to the control unit 8 on nutrition parameters and receiving control parameters from the control unit 8, see Box 500. As an alternative, the nutrition control means is part of the control unit 8. The sensors give information to the control unit 8 that in response gives driving parameters to the nutrition circuit regarding what nutrition should be added to the water in the water circuit 3, see Box 501.

Box 501 relates to that the nutrition circuit 6 receives water from the water circuit 3 and that water analysis is done by the sensors. The water analysis may be part of the nutrition circuit 6 such that water analysis can be done continuously in real time or that water analysis is done batch wise at predetermined time intervals either in the nutrition circuit or via an external entity where the data from the analysis is fed back to the control unit 8.

Box 600 relates to that the spacing circuit 7 comprises spacing control means for controlling the spacing circuit 7. The spacing control means for the spacing circuit 7 is configured to communicate with the control unit 8. The control unit 8 sends control information to the spacing control means with information on operation for the spacing circuit 7.

The spacing control means may comprise sensors and/or computing means and/or controlling means for controlling the spacing circuit 7. The spacing control means then communicates with the control unit 8 giving information to the control unit 8 on spacing parameters and receiving control parameters from the control unit 8, see Box 600. As an alternative, the spacing control means is part of the control unit 8. The sensors give information to the control unit 8 that in response gives driving parameters to the spacing circuit regarding what spacing should be added to the cultivation profiles 21, see Box 601.

Box 601 relates to that the spacing circuit 7 is configured to space plants apart in the plant bed 9 over time and thus arranges the cultivation profiles 21 in a proper manner dependent on where in the life cycle the plants are, i.e. the state of the plant in time.

Figure 10:
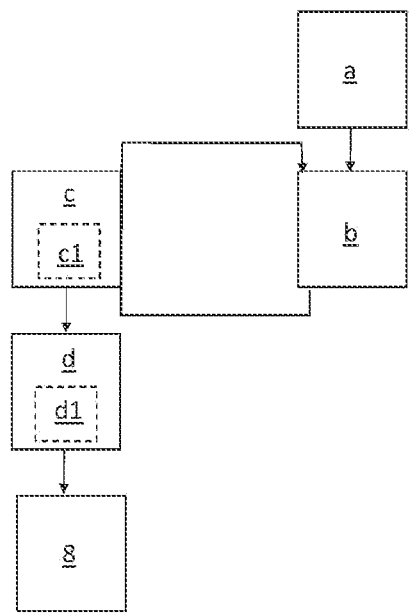
FIG. 10 schematically shows a flow chart of an optimization method for a cultivation plant according to FIGS. 1-9.

FIG. 10 schematically shows a flow chart of an optimization method for a cultivation plant 1 according to FIGS. 1-9.

The method comprises the steps of training the control unit 8 in a training cultivation plant 1 comprising a training control unit 8, corresponding circuits 2, 3, 4, 5, 6, 7 and plant yield control unit 10 by a)—the training control unit 8 sending start driving parameters to the circuits 2, 3, 4, 5, 6, 7,
  the training control unit 8 storing the driving parameters,
  the plant yield control unit 10 sending growth and/or quality information to the training control unit 8, b)—the training control unit 8 receiving growth and/or quality information from the plant yield control unit 10,
  the training control unit 8 storing growth and/or quality information,
  the training control unit 8 comparing stored driving parameters with growth and/or quality information,
  the training control unit 8 analyzing which parameter or parameters contribute towards a positive growth and/or quality by comparing stored driving parameters, and
  the training control unit 8 analyzing which parameters contribute towards a negative growth and/or quality by comparing stored driving parameters,
and
  the training control unit 8 overlaying the analysis on previous analysis in order to over time build a model of how the growth and quality is affected by the driving parameters by weighing the contributions to the decision with positive reinforcement for successful contribution and negative reinforcement for less successful contribution,
  the training control unit 8 changing one or more driving parameters by either randomly changing one or more parameters or combining parameters from multiple sets of stored driving parameters to create a new set of driving parameters not tested before,
  the training control unit sending changed driving parameters to the circuits,
  the training control unit storing the driving parameters,
  the plant yield control unit sending growth and/or quality information to the training control unit, c)—the training control unit performing steps b) until a predetermined minimum level of positive change of growth and/or quality is reached, d)—the training control unit 8 sending stored driving parameters to the control unit 8 for driving the cultivation plant 1 after finalization of step c) according to a chosen parameter strategy.

Here, it should be noted that the ideal time of growth is set by the parameter strategy and the predetermined quality is set by the quality measure chosen for the specific plant. The plant yield control unit comprises means for checking growth and quality. Growth is a separate parameter and quality is a separate parameter. A high yield, i.e. growth per time unit, of the plant does not necessarily mean that the quality is good why this is checked as a separate parameter.

Here, quality refers to a design parameter set up by the operator of the cultivation plant. It can be color and/or taste and/or texture and/or any other suitable parameter. Furthermore, the plant yield control unit is not limited to measure both growth and quality, but any one of growth or quality can be measured and further yield parameters can be added. The plant yield control unit comprises means for measuring the selected parameters at specific points in time. The chosen points in time are selected such that they correlate with measurements made in one or more of the other circuits, i.e. the stored driving parameters in the control unit. The correlation is necessary in order to be able to couple the yield parameters to the stored driving parameters and thus get feedback on changes of the driving parameters in one or more circuits. Growth can be measured by any suitable sensor arrangement that can identify growth of a plant. Quality can be measured by any suitable sensor arrangement that can identify one or many of the design parameters. However, the growth and/or quality can be judged manually by one or more persons that check and evaluate the plant growth and/or quality. The evaluation of growth can be made by simply measuring the plant at different points in time and where the end of the growth cycle is determined by e.g. a declining growth rate and/or when the plant size has reached a set value. The plant size can be height and/or width of the entire plant or one or more parts of the plant, e.g. leafs, buds or plant stems. The quality can be judged dependent on plant and targeted end user, and for some plants color is more important than taste, but it can also be the opposite. Quality can further relate to one or more selected nutrition. Quality can also be texture and feel of the plant. The invention is not limited to these example, but combinations of the examples are possible as well as additional aspects on quality.

The method comprises a software based optimization routine that uses collected data on growth and/or quality that is dependent on driving parameters in each circuit. The driving parameters are parameters that influence growth and/or quality in different ways. The complexity here lies in that a change of one parameter may give one beneficial result that can be identified, but changing another parameter may inhibit the beneficial result or may enhance the beneficial result. The different circuits driving the cultivation room comprises a large number of driving parameters, for example carbon dioxide, air speed, air mass flow and direction of air relative the plants in the air circuit; amount of water in the water circuit, temperature in the heat circuit, radiant flux in the light circuit, nutrition in the nutrition circuit; and spacing between plants in the spacing circuit. Here, the nutrition circuit itself comprises many different nutrition that can be optimized themselves. Hence, the large number of parameters and their possible combinatory effect, i.e. the synergistic effects, on the growth and/or quality puts high demand on the possibility to correlate the parameters in the best way over time. Here, the optimization routine gathers data over time and correlates changes in the parameters with the effect on growth and/or quality.

Here, it is important that the correlation relates to when in time the changes are made and what the correlated effect was on the growth and/or quality.

One possibility is to change one parameter at the time over a range of changes and wait to see what the effect on growth and/or quality was for the variations of the parameter and then store the effect from each change of the parameter. The changes of all parameters are stored together with the correlated effect on growth and/or quality. This possibility gives a matrix of driving parameters and correlated effect that can be used in the optimization method.

In view of the above, the method comprises in step a) starting values for the parameters based on empiric data that gives a good growth and/or quality. In steps b) and c) the method preferably comprises the steps of changing numerous parameters at the same time. The control unit stores the changed parameters and the growth and/or quality data into a table of data used by the control unit when evolving the parameters such that changes converge towards a better growth and or/quality over time. The control unit may comprise calculating means that can interpolate and extrapolate between successful parameter values in one or all dimensions, i.e. for one or more of the parameters. The control unit can also, or as an alternative, comprise a number generator that gives changes to one or more of the parameters either by randomly changing one or more parameters or combining parameters from multiple sets of stored driving parameters to create a new set of driving parameters not tested before.

The control unit evolves the method by overlaying the analysis on previous analysis in order to over time build a model of how the growth and quality is affected by the driving parameters by weighing the contributions to the decision with positive reinforcement for successful contribution and negative reinforcement for less successful contribution. The method steps b) and c) can be performed by a number of known techniques referred to within the realm of artificial intelligence using artificial neural networks and e.g. machine learning and/or deep learning. The control unit has further the ability to combine stored recipes of parameters using generic algorithms, which algorithms are known in the art per se. Here, "stored recipes" refers to stored parameters from a number of training loops according to step b).

The control unit can be set to operate such that each parameter is given a range of values between which the parameters can be changed. The control unit can also be set to operate one or more parameters under fixed values not to be part of the optimization method.

According to one example, a number of test cultivation plants are established, each connected to the above-mentioned circuits. Each training cultivation plant comprises one or a few plants subject to the changes of the parameters according to the optimization method. The training cultivation plants are driven simultaneously with same or different parameters and the control unit collects data to be used driving a full-scale cultivation plant.

According to one example, the method comprises in step b) the step of the plant yield control unit sending growth and/or quality information when a predetermined level of growth and/or quality has been reached and/or when the rate of growth has reached a predetermined minimum level, i.e. when the growth rate declines towards the minimum value such that further growth is considered to be too time consuming.

According to one example, the method comprises the step of:
storing driving parameters and correlated progressive information on growth and/or quality during a growth cycle of the plant.

According to one example, the method comprises the step of
changing driving parameters dependent on progressive information.

According to one example, the plant yield control unit is configured to send the progressive growth and/or quality information during the growth cycle at a predetermined frequency, i.e. the plant yield control unit sends progressive growth and/or quality information from the start of the growth and at predetermined time intervals until the predetermined level of growth and/or quality has been reached and/or when the rate of growth has reached the predetermined minimum level. The training control unit stores the progressive information correlated to the driving parameters sent at the start. One advantage here is that the method allows for learning of an early detection on growth and/or quality dependent on changed parameters such that the training control unit can abort further driving of plants with less favorable effect on growth and/or quality, i.e. the control unit can identify if the plants(s) reacts in a positive way with changed parameters before the plant is fully grown. Here, it should be noted that the step of aborting early is only possibility after the training control unit has enough data stored regarding growth and/or quality of fully grown plant(s) and correlated progressive information. Furthermore, the progressive information can be used to check growth rate dependent on chosen parameter strategy.

According to one example, the method, after completing step c), further comprises step
c1—the training control unit 8 performing steps b) minimizing one or more of the driving parameters until the growth and/or quality deviates negatively from the predetermined level of growth and/or quality. This step is intended to find a minimum use of resources in the circuits, e.g. water, nutrition, energy, air, carbon dioxide etc., without compromising the time of growth and/or quality. Here, it should be noted that the ideal time of growth is set by the parameter strategy and the predetermined quality is set by the quality measure chosen for the specific plant.

According to one example step c) relates to finding a parameter strategy for optimum growth and quality. One advantage here is that the method finds driving parameters for an optimum balance of growth in view of quality.

According to one example step c) relates to finding a parameter strategy for minimum level of growth with respect to time and with a predetermined quality. One advantage here is that the method finds driving parameters that slows down the growth rate of the plant but with maintained quality of the final product/plant. For example, this parameter strategy can be used in the event that the demand for the plant has gone down or that a trend shows a lesser demand in the near future, and a slower growth rate gives a delay in reaching the final product/plant that allows for meeting a delayed and increased demand.

According to one example step c) relates to finding a parameter strategy for maximum level of growth with a predetermined quality. One advantage here is that the method finds driving parameters that speeds up the growth rate of the plant but with maintained quality of the final product/plant. For example, this parameter strategy can be used in the event that the demand for the plant has increased or that a trend shows a higher demand in the near future, and a higher growth rate gives a more early final product/plant that allows for meeting the increased demand.

According to one example, the method step a) comprises the step of:
the training control unit 8 receiving start driving parameters from an external source. Here, the start driving parameters may be collected or derived from an external source of information, for example published research data and/or an external AI solution and/or information from the full-scale production plant, etc.

The invention further relates to a method for optimizing a plant and driving parameters in a cultivation plant 1 comprising a cultivation room 1a comprising an air circuit 2, a water circuit 3, a heat circuit 4, a light circuit 5, a nutrition circuit 6 and a spacing circuit 7, wherein the air circuit 2 comprises a dehumidification unit 13 configured to dehumidify air in the air circuit 2 and feed excess water to the water circuit, the cultivation plant 1 comprising a control unit 8 configured to control the circuits,
the cultivation room 1a comprising a plant bed 9 for plants and
a plant yield control unit 10 analyzing growth and/or quality of the plants and driving parameters for the circuits,
wherein the method comprises the steps of
a)—the control unit 8 receiving driving parameters to the circuits from the training control unit dependent on parameter strategy,
the control unit 8 storing the driving parameters,
the control unit 8 sending driving parameters to the circuits Here, the full-scale production plant benefits from the trained data/information regarding suitable driving parameters dependent on chosen parameter strategy. The control unit can collect driving parameters from the training control unit upon change of chosen parameter strategy, but as an alternative the control unit has stored all or selected data from the training control unit such that the control unit can send suitable driving parameters to the circuits upon change of chosen parameter strategy without further communication with the training control unit.

According to one example, the method further comprises steps b):

the plant yield control unit 10 sending growth and/or quality information to the control unit 8.
the control unit 8 receiving growth and/or quality information,
the control unit 8 storing growth and/or quality information.

Here, the full-scale production plant further stores information that can be used for optimization in the training control environment.

According to one example, the method further comprises the following steps:

Step b) further comprising the steps of:
the control unit 8 comparing stored driving parameters with growth and/or quality information,
the control unit 8 changing one or more driving parameters,
the control unit 8 sending changed driving parameters to the circuits,
the control unit 8 storing the driving parameters,
the plant yield control unit 10 sending growth and/or quality information to the control unit 8,
c)—the control unit 8 performing steps b) until a predetermined level of growth and/or quality is reached
d)—the control unit 8 sending driving parameters to the control unit for driving the cultivation plant 1.

Here, the full-scale production plant further optimizes driving parameters and stores information that can be used for optimization in the training control environment.

According to one example, the method further comprises the following step:
d1)—the control unit 8 performing steps b) minimizing one or more of the driving parameters until the growth and/or quality deviates negatively from the predetermined level of growth and/or quality.

Here, the control unit can optimize a minimum use of resources in the circuits in the same manner as stated above in connection to the training control unit.

According to one example, the method further comprises the steps of:
the control unit 8) sending driving parameters and correlated information on growth and/or quality to the training control unit.

The invention claimed is:

1. A cultivation plant comprising a cultivation room comprising an air circuit, a water circuit, a heat circuit, a light circuit, a nutrition circuit and a spacing circuit,
the cultivation plant comprising a control unit configured to control the circuits,
the cultivation room comprising a plant bed for plants, and
a plant yield control unit configured to give input on growth and/or quality of the plants to the control unit,
the control unit being configured to store driving parameters for the circuits and correlated input from the yield control unit,
wherein the cultivation plant comprises an adjacent facility, the adjacent facility being arranged adjacent the cultivation room, wherein the air circuit comprises an intake conduit configured to lead air from the adjacent facility to the air circuit wherein the air circuit comprises a dehumidification unit configured to dehumidify air in the air circuit,
wherein the dehumidification unit comprises an air inlet configured to receive air from the air circuit and an air outlet configured to feed dehumidified air to the plant bed,
wherein the dehumidification unit comprises a water outlet configured to feed condensed water to a water inlet of the water circuit that in turn comprises a water outlet that feeds water to an inlet of the nutrition circuit that in turn comprises an outlet that feeds nutrition water to the plant bed,
wherein the dehumidification unit comprises a heat circuit exchanging heat with the adjacent facility, wherein the plant bed comprises cultivation profiles extending in a length direction (X), a width (Y) direction and a height direction (Z),
wherein each cultivation profile comprises a bottom wall extending in the width direction (Y) and the length direction (X) and side walls connected to each side of the bottom wall and extending in the length direction (X) and the height direction (Z), wherein the bottom wall is configured to lead the water in and out from the water circuit,
wherein the cultivation profile comprises a top wall opposing the bottom wall and covering the side walls, wherein the top wall comprises openings for receiving plants to be cultivated,
wherein the light circuit is configured to feed light to the plant bed, and
wherein the spacing unit is configured to space plants apart in the plant bed over time.

2. A cultivation plant according to claim 1, wherein the plant bed comprises a number of cultivation profiles arranged side by side with one side wall of one cultivation profile facing one side wall of an adjacent cultivation profile, wherein the cultivation profiles are arranged to move along the plant bed over time with an increasing distance between them over time.

3. A cultivation plant according to claim 1, wherein the openings in the cultivation profiles are arranged offset to each other with relation to adjacent cultivation profiles.

4. A cultivation plant according to claim 1, wherein the openings in the cultivation profiles are arranged with openings corresponding to type of grow media.

5. A cultivation plant according to claim 1, wherein the air outlet comprises air distribution units arranged in the plant bed and configured to control the mass flow and air speed of the air fed directly to the plant bed.

6. A cultivation plant according to claim 1, wherein the air outlet comprises air blending distribution units positioned outside the plant bed and configured to create an air motion outside the plant bed for blending different air fractions with different temperatures to a blend.

7. A cultivation plant according to claim 1, wherein the light circuit is configured to feed light to the plant bed and excess heat to the adjacent facility.

8. A cultivation plant according to claim 1, wherein the spacing circuit comprises an elevator means configured to elevate cultivation profiles from a first plant bed level to a second plant bed level in the height direction (Z).

9. A cultivation plant according to claim 1, wherein the cultivation room is a closed room with a controlled environment dependent on the circuits.

10. A cultivation plant according to claim 1, wherein the control unit is configured to change parameters for an optimum efficiency of at least one of water, nutrition, air, heat or light.

11. A cultivation plant according to claim 1, wherein the control unit is configured to control the circuits based on yield and quality and based on optimum efficiency of each of the circuits and the result of changes in the various circuits are reflected in the yield and quality and minimum use of water, nutrition, air, heat and light and used in a control loop arrangement to further enhance yield and quality and/or efficiency of water, nutrition, air, heat and light.

* * * * *